March 8, 1949. A. F. KIPPER 2,463,697
MIXING MACHINE
Filed Jan. 14, 1947 4 Sheets-Sheet 1
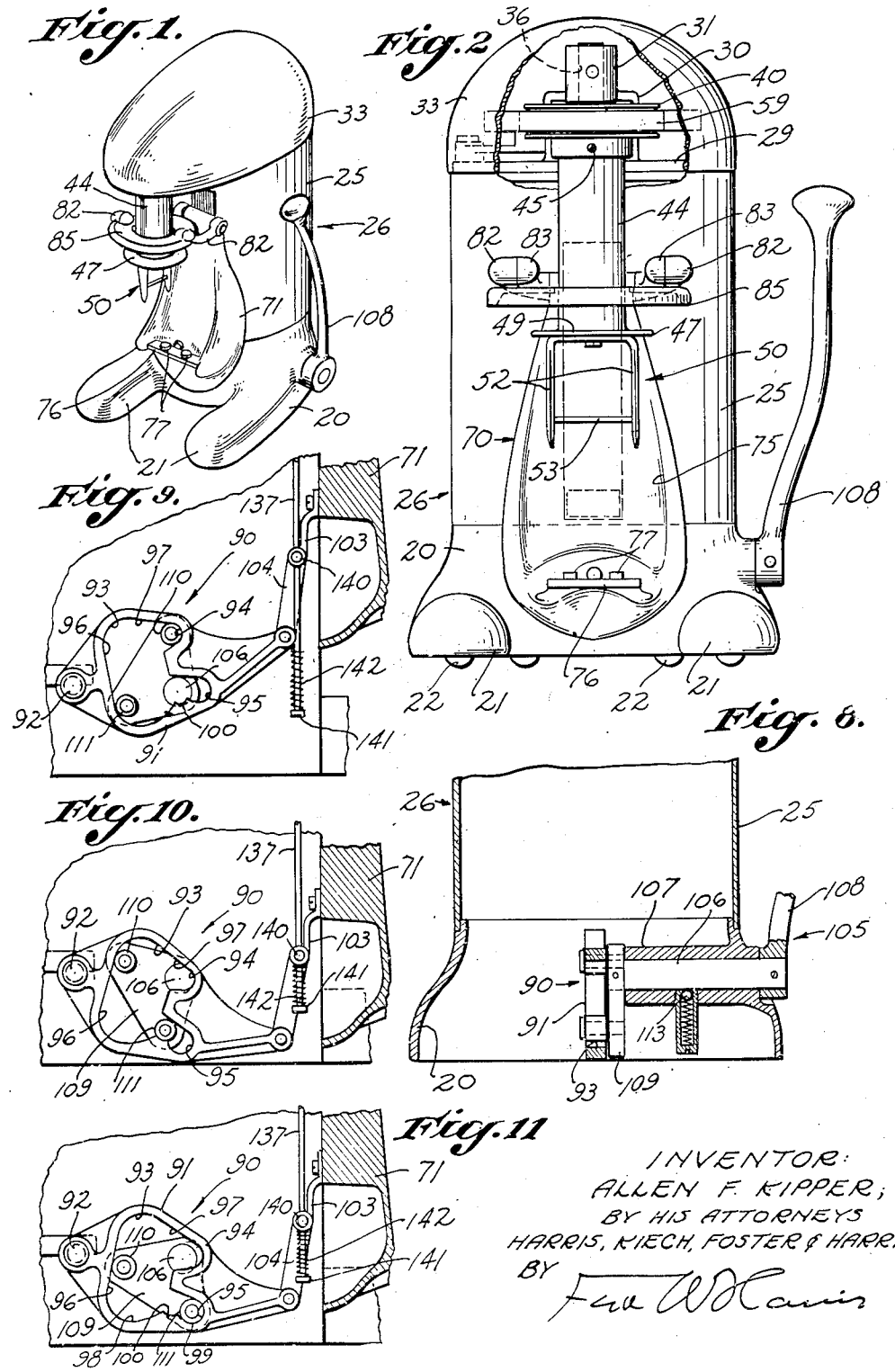
INVENTOR:
ALLEN F. KIPPER;
BY HIS ATTORNEYS
HARRIS, KIECH, FOSTER & HARRIS;
BY March 8, 1949.  A. F. KIPPER  2,463,697
MIXING MACHINE
Filed Jan. 14, 1947  4 Sheets—Sheet 2
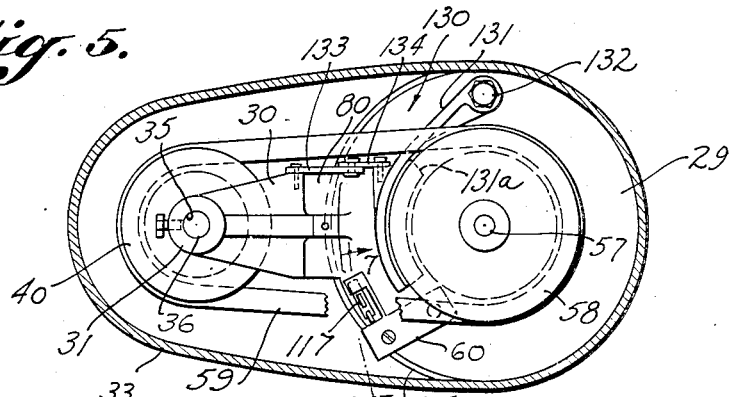
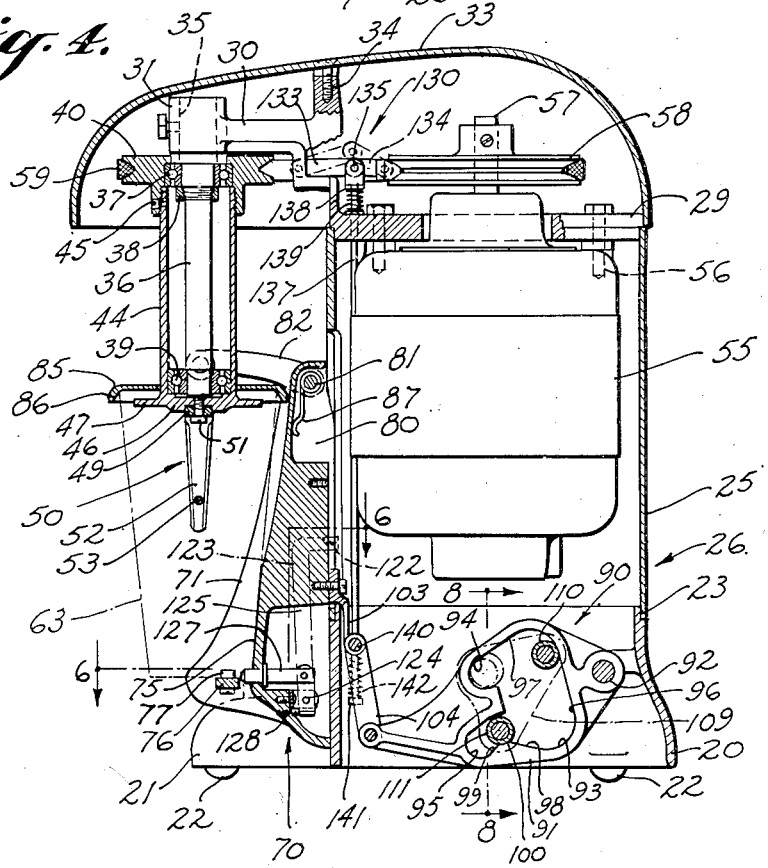
INVENTOR:
ALLEN F. KIPPER
BY HIS ATTORNEYS
HARRIS, KIECH, FOSTER & HARRIS, March 8, 1949.　　　A. F. KIPPER　　　2,463,697
MIXING MACHINE
Filed Jan. 14, 1947　　　　　　　　　　　4 Sheets-Sheet 3
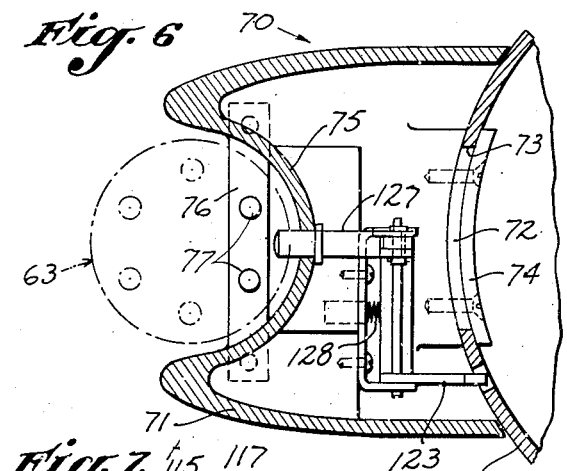
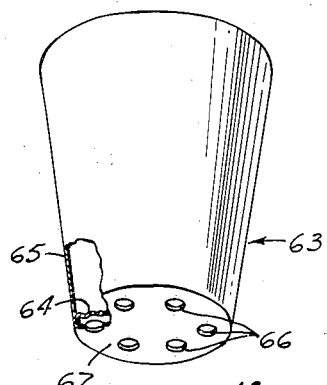
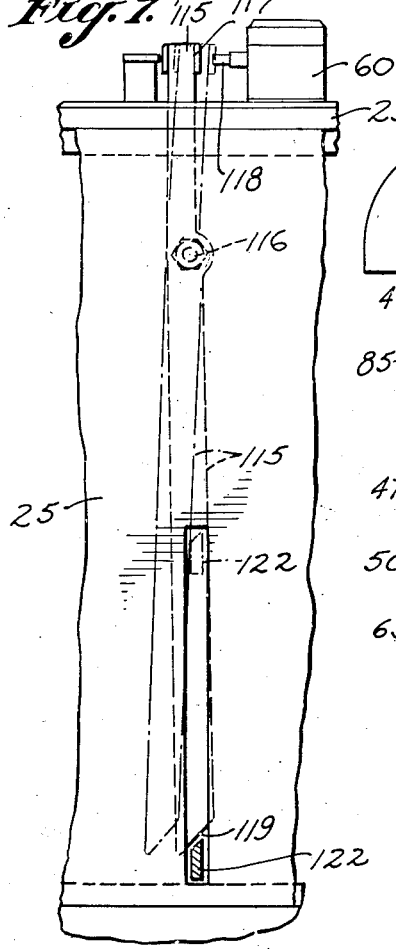
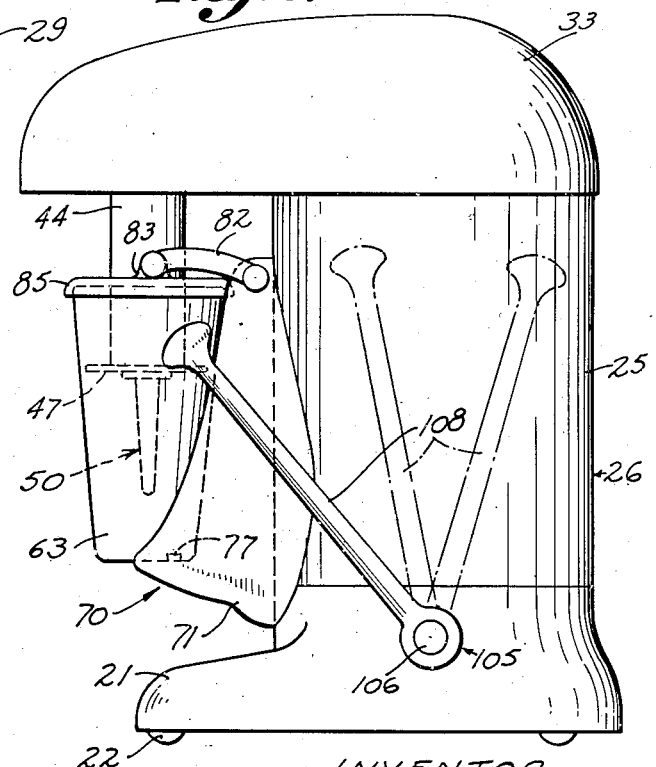
INVENTOR:
ALLEN F. KIPPER;
BY HIS ATTORNEYS
HARRIS KIECH, FOSTER & HARRIS,

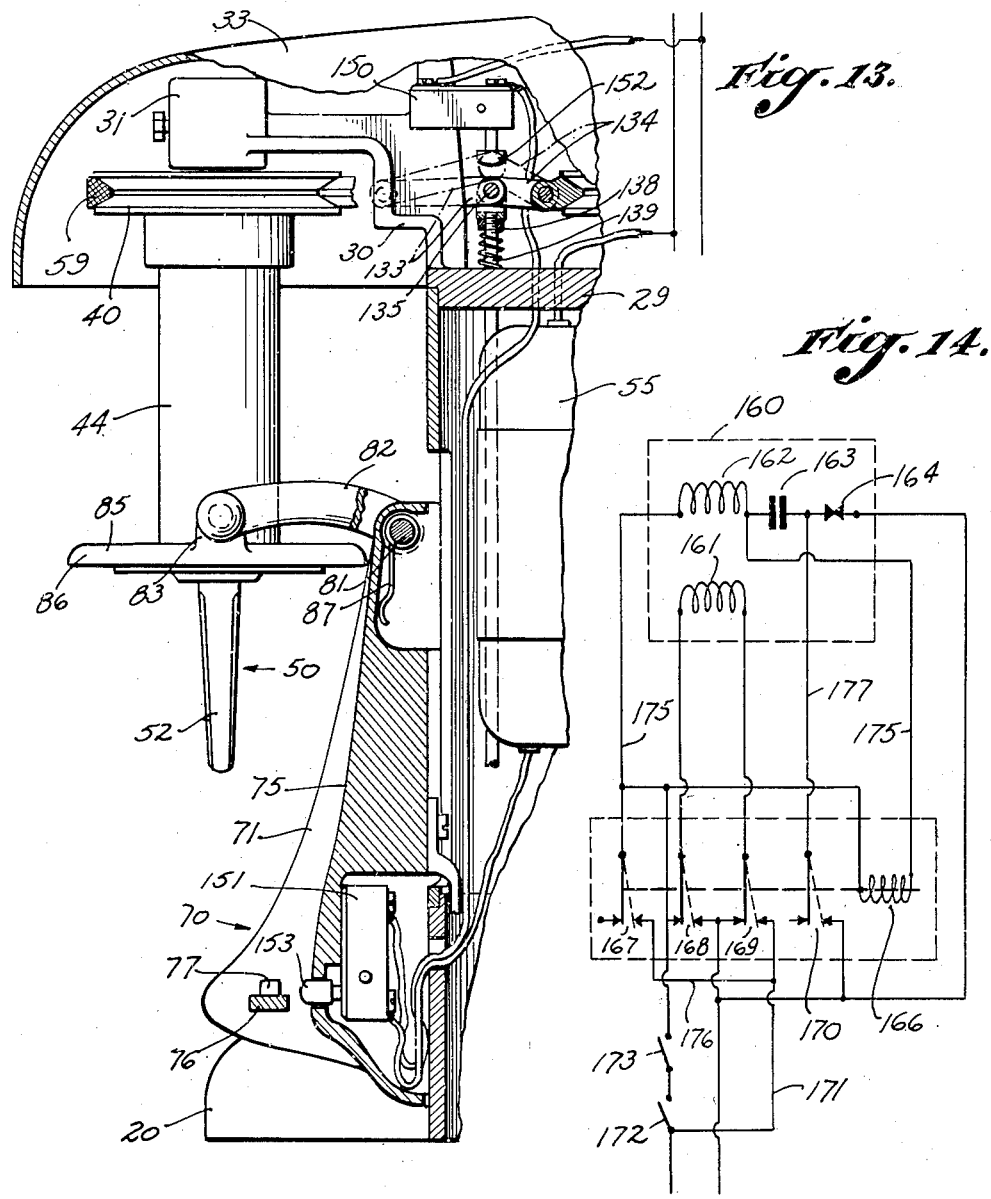

UNITED STATES PATENT OFFICE 2,463,697

MIXING MACHINE

Allen F. Kipper, Glendale, Calif., assignor to Arden Farms Co., Los Angeles, Calif., a corporation of Delaware Application January 14, 1947, Serial No. 722,009

17 Claims. (Cl. 259—108)

This invention relates generally to mixing machines and particularly to that type of machine commonly employed in drinking establishments for mixing ice cream drinks such as "shakes," "malts" and "frappes."

Various types of portable mixing devices are employed for mixing or combining ingredients such as ice cream, milk and syrup to produce iced drinks, e. g., those named above. The most common type of mixing device consists of a standard having an electric motor at its upper end, the armature shaft of the motor projecting downwardly and carrying an agitator element adapted to enter a container to mix the contents thereof, the container being usually frictionally gripped on the standard and adapted to close a switch disposed on the standard and included in the electric circuit for the motor. In mixing devices of this character, the container is, in effect, suspended from the standard and, since its bottom end is unsupported, the container is unstable and is apt to be accidentally shaken from the gripping means. Moreover, such mixers are made relatively small for convenience in moving them from place to place and since they employ electric motors of small capacity, considerable time is consumed in completing the mixing operation with the result that a plurality of the mixers are necessary to fill the many orders in a large establishment. In an effort to obviate the faults of such small-size mixers it has been proposed to use a mixing device or machine of larger proportions, employing a motor of greater horsepower capable of performing the mixing operation in a fraction of the time usually required to thoroughly mix and beat the ingredients. Such machines are adapted particularly for use in mixing relatively thick malts and shakes and, generally speaking, have been quite satisfactory in use. These machines, while being an improvement over mixers of the light-weight, portable type, have certain deficiencies. For example, it has been determined that the ice cream mixture is apt to spill out of the open end of the container due to the rapid rotation of the agitator element, causing loss of the mixture and soiling the clothes of the fountain attendant. Moreover, the spindle or shaft of the agitator is rotatable in bearings which are exposed so that the mixture sometimes contacts and congeals thereon and this not only causes wear on the bearings but retards the rotation of the agitator element and contaminates other drinks subsequently mixed. In addition, in such machines the container is placed on a vertically slidable holder or support member which is raised and lowered by manually operable means to effect relative movement of the container and agitator element, this movement causing the agitator element to enter the container to perform the mixing operation and, since no provision is made for preventing rotation of the container, it is necessary to grasp the container in one hand to restrain it from rotation. Due to the torque developed by the agitator and the fact that the metal container becomes very cold, it is extremely difficult to maintain a grip on the container, it having been found necessary to provide a longitudinal depression in the side of the container for the insertion of the fingers to provide a better hold on the container. Furthermore, mixing machines of this type may be started at any time, regardless of whether or not a container is used and it is thus possible to cause injury to the operator who may accidentally place his hand in contact with the rapidly rotating agitator element.

It is an object of my invention to avoid the faults of previously used mixing machines by providing a mixer of improved construction capable of rapidly and completely mixing ingredients in a container and one which may be operated with complete safety.

Another object of the invention is to provide a mixing machine of the character referred to having a vertically movable support for the container and cover means on the support adapted to automatically close the open end of the container when the container is placed on the support and during the mixing operation whereby to prevent spilling of the contents of the container.

Another object is to provide a mixer of a heavy duty type having means for engaging the container to positively prevent rotation thereof on its support during the mixing operation thereby avoiding the necessity of the operator to grip the container in the hand and enabling the operator to perform other duties in connection with the preparation of the drinks while attending the machine.

Another object is to provide a mixer of the type indicated in which the bearings for the agitator shaft or spindle are completely enclosed so that the danger of the mixture infiltrating into the bearings to impair their efficiency and cause an unsanitary condition is entirely avoided.

Another object is to provide a mixer of the type specified which includes an electric motor for rotating the agitator element and a control means operative in response to the placing of the container on its support to permit energization of the electric motor. Through this provision, the mixer can be operated only after a container has been placed in the correct position in the mixer and thus the danger of injuring the hands by contact with the rotating agitator element is entirely eliminated. Another advantage of the container-operated control means is that it practically eliminates the possibility of starting the motor by shaking or jarring the machine.

Another object is to provide a mixer having a manually controlled cam means for raising and lowering the supporting means for the container, said cam means being so constructed and arranged that it is adapted to move the container through a full stroke toward the agitator element to cause the element to enter the container to a maximum extent while performing the mixing operation, to separate the container and agitator element in a positive manner to arrest the mixing operation, and to move the container toward the agitator element through a partial stroke so as to dispose the rotating element within the container but above the mixture so that any mixture adhering to the element will be thrown off therefrom by centrifugal force into the container.

Through this improved construction, the container supporting means may be positively held against movement during the placing of a container thereon or its removal therefrom and this is an improvement over previous mixing machines in which the container supporting means is yieldingly held in lowermost position by gravity or under the influence of a spring and thus permitted to move during the placing of the container on or removing the container from the supporting means. Moreover, because the supporting means is operated in a positive manner, the use of a tension member for operating the brake of the machine is made possible and the brake will remain engaged during the time the supporting means remains in its inoperative position.

Another object is to provide a mixer of the character referred to which employs a relatively large motor capable of rapidly mixing and beating the ingredients and having a braking device for promptly arresting the rotation of the agitator element at the completion of the operation.

Another object is to provide a mixer of a semiportable type which is comparatively simple in construction and easy to service and one which is generally more efficient than previous machines used for like purposes.

Further objects of the invention will appear from the following specification and the drawings, which are intended for the purpose of illustration only, and in which:

Fig. 1 is a perspective view of my improved mixing machine;

Fig. 2 is an enlarged front elevational view of the mixing machine;

Fig. 3 is a side elevational view thereof showing the relative position of the parts during the mixing operation;

Fig. 4 is a vertical sectional view through the machine;

Fig. 5 is a plan view of the machine with the upper portion removed to expose the driving and braking means;

Fig. 6 is a sectional view taken on line 6—6 of Fig. 4;

Fig. 7 is a vertical sectional view taken on line 7—7 of Fig. 5;

Fig. 8 is a sectional view taken on line 8—8 of Fig. 4;

Figs. 9, 19 and 11 are sectional views of the lower portion of the machine showing the cam means in different positions, these views being similar to the lower portion of Fig. 4 but viewed in the opposite direction;

Fig. 12 is a perspective view of the container used in the machine;

Fig. 13 is a vertical sectional view through the forward portion of the machine and showing an alternative means for controlling the energization of the electric driving motor; and Fig. 14 is a diagrammatic view showing an electric braking system which may be advantageously applied to use in my improved mixing machine.

Referring to the drawings in detail, my improved mixing machine includes a substantially circular base member 20 having a pair of forwardly projecting feet 21 for adding rigidity to the structure. Resilient pads 22 are spaced around the lower edge of the base and are adapted to rest upon a counter, shelf or other support to reduce vibration to a minimum. The upper rim of the base 20 is rabbeted as shown at 23 (Fig. 4) to adapt it to receive the lower end of a tubular upright member 25 which, together with the base member 20 provides a housing 26 for enclosing the operating parts of the machine. Attached to the upper end of the tubular member 25 is an annular closure member 29 provided with an arm or bracket 30 which projects upwardly and laterally and terminates in a cylindrical boss 31. A cap or hood member 33 is secured to the bracket 30 as by a screw 34 and encloses the driving and braking means to be later described, the hood having a forward portion which overlies the boss 31.

The boss 31 has a vertical bore 35 in which is secured the upper end of a spindle 36 which projects downwardly from the boss. The spindle 36 is reduced in diameter at a point slightly below the boss 31 to adapt it to receive the inner race of a ball bearing 37 and is further reduced and threaded to receive a nut 38 (Fig. 4.) On the lower reduced end of the spindle 36 is mounted a ball bearing 39. The ball bearing 37 is held in the bore of a grooved pulley 40 which has a depending hub provided with an axial threaded bore. The nut 38 is screwed upwardly on the threaded portion of the spindle 36 to retain the pulley 40 in position, the pulley being rotatable on the fixed spindle. Adapted to be screwed into the threaded bore of the pulley 40 is the upper end of a tubular shaft 44 which is held therein by a set screw 45. The lower end of the tubular shaft 44 is closed by a wall 46 and preferably this wall is extended laterally to provide a peripheral flange 47. In the lower surface of the wall 46 is a transverse groove for receiving the cross piece 49 of an inverted U-shaped agitator element 50, the cross piece being held in place by a screw 51 as shown in Fig. 4. The edges of the legs 52 of the agitator element 50 are preferably sharpened to provide knife edges adapted to cut through the ingredients being mixed to expedite the mixing thereof. The legs 52 may be connected by a rod-like strut 53 to strengthen the structure. It will be apparent from the above description and from an inspection of Fig. 4 of the drawings that the bearings 37 and 39 are entirely enclosed and thus the possibility of the mixture contacting therewith is avoided. Through this construction the bearings may be lubricated without danger of the lubricant contaminating the mixture.

The tubular shaft 44 and its attached agitator element 50 are adapted to be rotated at a comparatively fast speed by means of an electric motor 55. As shown in Fig. 4, the motor 55 is attached to and suspended from the annular closure member 29 by means of bolts 56, the motor being disposed within the tubular member 25 with its armature shaft 57 extending vertically. On the upper projecting end of the armature shaft 57 is a grooved pulley 58 which is adapted to drive the pulley 40 by means of a V-belt 59. Thus, when the electric motor 55 is energized it drives the agitator element at high speed through the medium of the pulleys 58 and 40 and the belt 59. The motor 55 is connected in an electric circuit which includes a pushbutton switch 60 (Figs. 5 and 7) which is fastened to the top of the closure member 29 and is operated by means to be described hereinafter.

The substances to be mixed are contained in a metal container 63 which, as shown in Fig. 12, is provided with a circular bottom wall 64 and an upstanding circular wall 65 which provides an open upper end. Spaced below the bottom wall 64 is a false bottom 67 provided with a series of spaced apertures 66 for a purpose to be presently explained.

The container 63 is adapted to be held by a supporting means indicated generally at 70. The supporting means 70 includes a hollow slide member 71 having the edges of its rearward open side resting against the periphery of the tubular housing member 25. A pad 72 on the interior of the slide member 71 passes through a vertical opening 73 in the side of the member 25 to mount the member 71 for vertical sliding movement thereon, a curved plate 74 of greater width than the width of the opening being secured to the pad to retain the parts in this relationship. The front wall of the slide member 71 is curved to provide a recess 75 (Fig. 6) for receiving the container 63. Extending between the sides of the arcuate front portion of the member 71 adjacent the lower end thereof is a transverse strip 76 which constitutes a shelf for supporting the container 63. The shelf 76 has a pair of upstanding lugs 77 which are adapted to enter any two adjacent apertures 66 in the bottom of the container to prevent rotation of the container during the mixing operation.

The upper end of the member 71 is narrowed in width to provide a boss 80 having a transverse hole for receiving a pivot pin 81, to the ends of which are pinned a pair of arms 82 which extend forwardly with their outer ends pivotally connected to upstanding bosses 83 of an annular cover member 85. The cover member 85 is of inverted dish shape, being provided with a depending flared rim 86. The cover member 85 surrounds the tubular shaft 44 and, being pivoted at the ends of the hinged arms 82, is adapted to slide vertically with respect to the agitator element 50. A spring 87 acting between the pin 81 and the member 71 normally acts to pivot the arms 82 downwardly to maintain the cover member 85 seated against the flange 47. During the placing of the container 63 in the machine it is moved simultaneously upwardly to cause the agitator element 50 to enter the container and the upper rim of the container to engage the yieldable cover member 85. The cover member 85 thus effectively closes the upper end of the container 63 to prevent spilling of its contents due to the turbulent action created by the agitator element during the mixing and beating operation. The mounting of the container 63 in the machine is completed by lowering it upon the shelf 76 and causing the lugs 77 to enter a pair of the apertures 66 in the bottom of the container. It is apparent from the above that the container 63 is held firmly between the shelf 76 and the cover member 85 and is keyed against rotation by the engagement of the lugs 77 in the apertures 66.

The slide member 71 of the container supporting means 70 is slid upwardly to cause the agitator element 50 to move further into the container 63, as shown in Fig. 3, to better agitate and mix the ingredients. Vertical sliding movement of the member 71 and its attached container 63 is accomplished by cam means, indicated generally at 90 in Figs. 4, 9, 10 and 11. The cam means 90 includes a cam arm 91 which is pivoted within the housing base 20 on a transverse pin 92. The cam arm 91 has an opening 93 of irregular shape, the forward side of the opening having a pair of spaced recesses 94 and 95 while the rearward side 96 of the opening is straight. Adjacent the upper recess 94 the side of the opening 93 is formed with an inclined cam face 97 and adjacent the lower recess 95 the opening is provided with a pair of angular cam faces 98 and 99 and a flattened rest or dwell 100 at the point of intersection of the faces 98 and 99. The forward end of the cam arm 91 is operatively connected to a bracket 103 on the rearward face of the slide member 71 by means of a link 104 to provide that when the cam arm is pivoted, the slide member will be slid vertically on the housing 26.

The cam arm 91 is adapted to be pivoted by a manually operable means, indicated at 105. The manually operable means 105 includes a transverse shaft 106 which is rotatable in a bearing boss 107 forming part of the base member 20 (Fig. 8). Secured to the outer projecting end of the shaft 106 is an operating handle 108 and fastened to its inner end is a triangularly shaped plate 109 which carries a pair of rollers 110 and 111. When the operating handle 108 is in the neutral position shown in Fig. 1, the rollers 110 and 111 are respectively located against the straight side 96 and upon the rest 100 of the cam opening 93 (Figs. 4 and 10) to maintain the cam arm 91 and slide member 71 in the lowermost or inoperative position shown in Fig. 4. To raise the slide member 71 and the container 63, the handle 108 is pivoted forwardly to the position shown by full lines in Fig. 3, whereupon the roller 110 will ride along the inclined cam surface 97 to pivot the cam arm 91 upwardly to the position shown in Fig. 9. At the end of this movement of the parts, the roller 110 will be located in the upper recess 94 while the other roller 111 will be against the straight face 96 of the opening 93. The cam arm 91 is also adapted to be pivoted to the position shown in Fig. 11 for a purpose to be explained hereinafter. The shaft 106 and cam arm 91 are adapted to be held in their different positions by a spring pressed detent ball 113 (Fig. 8) engageable in circumferentially spaced depressions in the shaft.

The switch 60 which is in the electric circuit for the motor 55 is adapted to be actuated by a relatively long lever 115 which is pivoted at 116 against the inner surface of the tubular housing member 25. The upper end of the actuating lever 115 has a bent finger 117 adapted to engage and depress the push button 118 of the switch 60. The lower end of the lever 115 is provided with an angular cam edge 119 which is adapted to be engaged by a lateral finger 122 of an angular control lever 123 pivoted at 124 within a cored recess 125 in the rearward side of the slide member 71 (Fig. 4). Above the pivot 124 the lever 115 is connected to a horizontal control plunger 127 slidable in a hole in the slide member 71 and arranged with its forward end disposed within the recess 75 and adjacent the shelf 76 in position to be engaged by a container 63 supported by the slide member. The plunger 127 is normally urged outwardly to this position by a spring 128. When a container 63 is placed on the shelf 76 it will depress the plunger 127 which then acts to pivot the control lever 123 to dispose its finger 122 beneath the cam edge 119 of the switch actuating lever 115. When the slide member 71 is subsequently raised in the manner previously explained, the finger 122 will pivot the actuating lever 115 with a cam action to cause the finger 117 to close the switch 60 and thus energize the electric motor which then rotates the agitator element 50 at high speed. After the mixing operation has been completed the slide member 71 and container 63 are lowered and the lever 115 will release the plunger of the switch 60 to open the circuit to the motor 55. It will be apparent from the foregoing that actuation of the switch lever 115 can be attained only when the control plunger 127 and its connected control lever 123 are operated by a container 63 accurately placed on the supporting means. In other words, operation of the motor 55 and rotation of the agitator element can be effected only after a container has been placed in the machine and the operating handle 108 manipulated. Since the energization of the motor is dependent upon both the presence of a container on the supporting means and the operation of the handle, it will be apparent that accidental starting of the machine as by shaking or jarring or by inadvertently pressing a starting button or other means, as in prior mixing machines, is entirely avoided and thus the possibility of seriously injuring the hands by placing them against the rotating agitator element is eliminated.

It is desirable that the rotation of the agitator element 50 be promptly arrested after a mixing operation so that the container 63 can be removed without interference from the agitator element. In the present machine the rotation of the agitator element 50 is arrested by means of a braking device 130 (Figs. 4 and 5). The braking device 130 includes a brake shoe 131 pivoted at 132 on the closure member 29 and carrying a curved brake pad 131a of wedge shaped cross section adapted to be forced into the V-groove of the driving pulley 58 to stop the rotation of the latter. The brake shoe 131 is operated by means of a pair of toggle levers 133 and 134 which are pivoted together at 135, one lever 133 being pivoted to the bracket 30 and the other lever 134 pivoted to the brake shoe. Slidable in a hole in the member 29 is a pull rod 137 having a lock nut 138 near its upper threaded end and engaged by threads to the bottom of a U-shaped element 138 carried by the pivot 135. A spring 139 is normally operative to tilt the toggle levers 133 and 134 upwardly as shown by dash lines in Fig. 4 to disengage the brake pad 131a from the pulley 58. The pull rod 137 extends downwardly through a hole in the pivot stud 140 for the link 104 and its lower end has a head 141. Disposed on the rod 137 between the stud 140 and head 141 is a coil spring 142. As the cam arm 91 is tilted downwardly to lower the container 63 and to open the switch 60, the stud 140 acts to compress the spring 142 which draws the pull rod 137 downwardly, such motion acting to straighten the toggle connection 133, 134 against the action of the spring 139 and apply the brake to promptly arrest the rotation of the agitator element 50. When the cam lever 91 is swung upwardly to start the mixing operation, the spring 142 is extended and the spring 139, then being the stronger, acts to break the toggle to disengage the brake pad 131a from the pulley 58, the release of the brake taking place prior to the closing of the switch 60.

It is desirable that any mixture which adheres to the agitator element 50 be removed therefrom and deposited in the container 63 so as to prevent dripping thereof onto the shelf, counter or other support upon which the machine is mounted. The present invention contemplates the removal of the mixture from the agitator element by rotating the element while the element is located adjacent the upper end of the container and above the contents thereof. To accomplish this result the cam arm 91 is moved upwardly to only a slight degree, as shown in Fig. 11, this movement being sufficient to slide the container supporting member 71 upwardly through only a partial stroke and to release the brake and close the switch 60. This operation is effected after the mixing operation has been completed and the cam arm 91 has been moved to the position shown in Fig. 10 and may be accomplished by merely moving the operating handle 108 rearwardly as indicated by dot-and-dash lines in Fig. 3. As the agitator element 50 is rotated rapidly above the surface of the mixed contents of the container 63 particles or drops of the mixture which lightly adhere thereto are thrown off by centrifugal force against the inner surface of the container.

The complete operation of the improved mixing machine will be apparent from the foregoing description and will therefore be explained but briefly. Suffice it to state that the ingredients, which may comprise milk, ice cream, flavoring syrup and malt powder in several combinations, are placed in a container 63 and the latter then inserted in the machine upon the shelf 76 with the upper open end of the container closed by the resiliently operated cover member 85. The machine is then ready to perform the mixing operation which may be initiated by merely pivoting the operating handle 108 forwardly. Through the cam actuated means before noted, the brake 133 is released and the switch 60 closed to energize the driving motor 55 which then acts to rapidly rotate the agitator element 50 to cause the latter to violently agitate the ingredients, reduce the semi-solids to a substantially thick liquid and thoroughly combine the substances to produce malted shakes. The consistency of the mixture is controlled by the operational period of time, thick malts requiring much less agitation than lighter, more liquefied drinks. Because the agitator element is rotated at a high rate of speed, the mixing operation is greatly expedited and it is possible to produce shakes or malts in less than ten seconds. Since the container is firmly held in the machine without the aid of the operator, during the mixing of one drink, other drinks may be prepared for subsequent mixing and the production of the drinks thus substantially increased.

After the ingredients have been mixed, the operating handle 108 is moved to the substantially upright position indicated by dash lines in Fig. 3 whereupon the supporting member 71 and container 63 are lowered as shown in Fig. 4 and the rotation of the agitator element 50 promptly arrested. At this juncture, the container may be removed from the machine, but in order to prevent dripping of the mixture from the agitator element the machine may be momentarily operated to dispel particles of the mixture from the agitator element and deposit them in the container, this operation being accomplished by merely shifting the handle 108 rearwardly as indicated by dot-and-dash lines in Fig. 3. It will be observed from the foregoing that my invention provides a mixing machine which has many features not found in prior machines used for like purposes and that all of the several objects of the invention as outlined in the preamble of the specification are attained.

In the mixing machine illustrated in Figs. 1 to 12 the actuation of the switch to energize and deenergize the driving motor is accomplished by mechanical means which is responsive to the placing of a container on the supporting means. While such means is efficient and positive in operation, the invention also contemplates the use of the simplified control shown in Fig. 13. In this modified construction of the machine a pair of electric switches 150 and 151 is arranged in the circuit with the motor 55, the two switches 150 and 151 being connected in series in the circuit. The switch 150 is located above the toggle mechanism 133, 134 and has a push button 152 adapted to be depressed to close the switch when the pull rod 137 is slid upwardly to disengage the brake. The switch 151 is mounted on the rearward face of the slidable container supporting member 71 and has a push button or spring plunger 153 which projects through a hole in the member with its forward extremity arranged in position to be engaged and depressed by a container 63 placed on the shelf 76. Closing of the switch 151 by a container, properly inserted in the machine, completes the circuit to the switch 150 so that when the switch 150 is subsequently closed by actuation of the pull rod 137 the entire circuit is closed and the motor 55 thus energized. It will be apparent that the alternative arrangement shown in Fig. 13 simplifies the structure and provides a positive means for preventing operation of the machine unless a container is in place.

Referring now to Fig. 14, the present invention also contemplates the provision of an electric braking system for promptly arresting the rotation of the agitator element 50. In a mixing machine in which this alternative braking means is employed, the driving motor 160 is preferably of the capacitator starting, induction running, split-phase alternating current type and incorporated in the motor is a running coil winding 161, a starting coil winding 162, a condenser 163 and centrifugally operated contacts indicated at 164. The running winding 161 and starting winding 162 are adapted to be connected in either a main circuit or in an auxiliary circuit, the latter including a relay coil 166 adapted to actuate a series of switches 167, 168, 169 and 170. The main electric circuit includes a pair of switches 172 and 173, connected in series. The switch 172 may be arranged on the container supporting means 70 and adapted to be operated by a container 63 placed on the supporting means in the same manner in which the switch 151, previously described, is actuated. The switch 173 may be disposed within the casing of the mixer and adapted to be closed by and in response to upward sliding movement of the slide member 71. The auxiliary circuit by-passes the switches 172 and 173 as indicated at 171. The various elements 160 to 173, described above, are connected in the motor circuits as shown diagrammatically in Fig. 14.

Assuming that a container 63 is in place on the slide member 71 and that this member has been slid upwardly to effect the mixing operation, both switches 172 and 173 will be closed and line potential will be supplied through the main circuit to the running winding 161 of the motor by way of switch 168, the contact arm of which is at this time in the full line position, current then flowing from this winding, through the switch 169 to the power line to complete the main circuit and thus energize the running winding. Simultaneously, current will flow directly to the starting coil 162, thence through the condenser 163 and the contacts 164, which are closed at this time, and return to the electric source. The motor 160 thus is started and, when a predetermined speed is attained, the centrifugally operated contacts 164 will open to de-energize the starting winding 162 and the motor will continue to operate due to the continued energization of the winding 161.

When switch 173 is opened, due to lowering of the slide member at the completion of the mixing operation, the main circuit to the winding 161 will be de-energized. A surge potential will then be generated in winding 162 of the motor and this electric current will by-pass the condenser 163 and contacts 164 and flow through the closed circuit 175 to energize the relay coil 166. When the relay coil 166 is energized the spring operated contact arms of the switches 167 to 170 will move to the dotted-line positions and current will then flow from the power line through the auxiliary circuit, including the switch 169, to the running winding 161 and, after flowing through this winding, it will return to the other side of the power line by way of switch 168. It will be noted that this flow of current through the winding 161 is in a reverse direction. Current will also flow through line 176, switch 167, winding 162, line 177 and switch 170 to energize the winding 162. The energization of the windings 161 and 162 in the manner last explained will cause the motor 160 to decelerate rapidly in an effort to reverse its direction of rotation brought about by the reversal of the flow of current through the winding 161 with respect to the flow of current through the winding 162. When the motor 160 has decelerated to such speed that the surge generated in winding 162 is no longer of sufficient magnitude to maintain the relay coil 166 energized, the contact arms of the several relay switches 169 to 170 will move to their normal full line positions. The centrifugally operated motor starting contacts 164 meanwhile will have returned to their normally closed condition and the entire electric operating and braking system is thus restored to an idle condition in readiness to start the motor 160 when the switches 172 and 173 are again closed.

To obtain the desired consistency of the drinks mixed in the machine, a timing device may be incorporated in the machine, such a device being operative to arrest the mixing operation after a predetermined period of time. Such a device may be arranged to be set in motion by the upward sliding movement of the slide member 71 and operative to close an additional switch in the motor circuit. After a predetermined period of time the timing device would open the switch to de-energize the electric motor and thus arrest the mixing operation. Since the timing device could be of a type suitable for this purpose and arranged in various ways in the machine and because such a device forms no part of the present invention, it is not herein shown or described in detail.

While I have herein shown and described the invention as embodied in several preferred forms of construction, by way of example, it is to be understood that other modifications may be made in the structure and arrangement of the parts without departing from the spirit of the invention. Consequently, I do not wish to be limited to the exact embodiments herein disclosed but desire to be afforded the full scope of the appended claims.

I claim as my invention:

1. A mixing device for mixing a substance in a container, including: a vertically movable supporting means for receiving and supporting the container; mixing means provided with a rotary agitator element disposed above said supporting means and adapted to be disposed within the container and to stir the contents of the container; power means for rotating said agitator; operating means actuated in response to movement of said supporting means for selectively energizing and de-energizing said power means; and control means normally operative to prevent energization of said power means, said control means being adapted to be actuated in response to the placing of the container on said supporting means to permit energization of said power means by said operating means.

2. A mixing device for mixing a substance in a container, including: a vertically movable supporting means for receiving and supporting the container; mixing means provided with a rotary agitator element disposed above said supporting means and adapted to be disposed within the container and to stir the contents of the container; power means for rotating said agitator element; a single manually controlled means for moving said supporting means and selectively energizing and de-energizing said power means; and control means normally operative to prevent energization of said power means, said control means being adapted to be actuated in response to the placing of the container on said supporting means to permit energization of said power means by said manually controlled means.

3. A mixing device for mixing a substance in a container, including: supporting means for receiving and supporting the container; mixing means provided with a rotary agitator element adapted to be disposed within the container and to stir the contents of the container; an electric motor for rotating said agitator element; an electric circuit for said motor; a swtich in said circuit; switch-actuating means; and control means adapted to operate said switch-actuating means to open and close said switch, said control means being normally operative to withhold said switch-actuating means from operation but operative in response to the placing of the container on said supporting means for releasing said switch-actuating means for operation by said control means.

4. A mixing device for mixing a substance in a container, including: supporting means for receiving and supporting the container; mixing means provided with a rotary agitator element adapted to be disposed within the container and to stir the contents of the container; an electric motor for rotating said agitator element; an electric circuit for said motor; a switch in said circuit; switch-actuating means; and cam operated means adapted to operate said switch-actuating means to open and close said switch, said control means being normally operative to withhold said switch-actuating means from operation but operative in response to the placing of the container on said supporting means for releasing said switch-actuating means from operation but 5. A mixing device for mixing a substance in a container, including: supporting means for receiving and supporting the container; mixing means provided with a rotary agitator element adapted to be disposed within the container and to stir the contents of the container; an electric motor for rotating said agitator element; an electric circuit for said motor; a switch in said circuit; cam operated switch-actuating means adapted to open and close said switch; and control means normally operative to withhold said switch-actuating means from operation, said control means being engageable with and operated by the container placed on said supporting means to permit operation of said switch-actuating means.

6. A mixing device for mixing a substance in a container, including: supporting means for receiving and supporting the container; mixing means provided with a rotary agitator element adapted to be disposed within the container and to stir the contents of the container; an electric motor for rotating said agitator element; braking means for arresting the rotation of said agitator element; an electric circuit for said motor; a switch in said circuit; switch-actuating means; cam means for operating said switch-actuating means and adapted to operate said braking means; and control means normally operative to withhold said switch-actuating means from operation to maintain said switch open but operative in response to the placing of the container on said supporting means to permit operation of said switch-actuating means by said cam means, said cam means being adapted to release said braking means prior to the closing of said switch.

7. A mixing device for mixing a substance in a container having an open end, comprising: a housing; supporting means slidable vertically on said housing and adapted to support the container; mixing means including a rotary agitator element disposed on said housing above said supporting means in axial alignment with the container supported by said supporting means; power means for rotating said agitator element; cover means pivoted on said supporting means and engageable with the container for closing its open end; a shaft rotatable in said housing; a cam arm pivoted in said housing and provided with an irregularly shaped aperture providing an internal cam surface; means connected between said cam arm and said supporting means and adapted to slide said supporting means in response to pivotal movement of said cam arm; means carried by said shaft and engageable with said cam surface for pivoting said cam arm; and handle means on said shaft for rotating the same.

8. A mixing device for mixing a substance in a container having an open end, comprising: a housing; supporting means slidable vertically on said housing and adapted to support the container; mixing means including a rotary agitator element disposed on said housing above said supporting means in axial alignment with the container supported by said supporting means; power means for rotating said agitator element; cover means pivoted on said supporting means and engageable with the container for closing its open end; a shaft rotatable in said housing; a cam arm pivoted in said housing and provided with an irregularly shaped aperture providing an internal cam surface; means connected between said cam arm and said supporting means and adapted to slide said supporting means in response to pivotal movement of said cam arm; roller means carried by said shaft and engageable with said cam surface for pivoting said cam arm; and handle means on said shaft for rotating the same.

9. A mixing device for mixing a substance in a container having an open end, comprising: a housing; supporting means slidable vertically on said housing and adapted to support the container; mixing means including a rotary agitator element disposed on said housing above said supporting means in axial alignment with the container supported by said supporting means; power means for rotating said agitator element; cover means pivoted on said supporting means and engageable with the container for closing its open end; a shaft rotatable in said housing; a cam arm pivoted in said housing and provided with an irregularly shaped aperture providing an internal cam surface; means connected between said cam arm and said supporting means and adapted to slide said supporting means in response to pivotal movement of said cam arm; a crank carried by said shaft; roller means carried by said crank and engageable with said cam surface for pivoting said cam arm; and handle means on said shaft for rotating the same.

10. A mixing device for mixing a substance in a container, comprising: a housing; supporting means slidable vertically on said housing and adapted to support the container; mixing means including a rotary agitator element disposed on said housing above said supporting means in axial alignment with the container supported by said supporting means; an electric motor for rotating said agitator element; an electric circuit for said motor; a switch in said circuit; a brake for arresting the operation of said motor; a shaft rotatable in said housing and provided with roller means; a cam arm pivoted in said housing and having an irregularly shaped aperture providing an internal cam surface, said roller means being disposed within said aperture and engageable with said cam surface and adapted upon rotation of said shaft to pivot said cam arm; a link connected between said cam arm and said supporting means and adapted to slide said supporting means in response to pivotal movement of said cam arm, movement of said supporting means in one direction causing said agitator element to enter the container to mix the contents thereof and movement of said supporting means in the other direction causing withdrawal of the container from said agitating element; and a handle on said shaft for operating the same.

11. A mixing device for mixing a substance in a container, comprising: a housing; supporting means slidable vertically on said housing and adapted to support the container; interengaging means on said supporting means and the container for preventing rotation of the container; mixing means including a rotary agitator element disposed on said housing above said supporting means in axial alignment with the container supported by said supporting means; an electric motor in said housing for rotating said agitator element; an electric circuit for said motor; a switch in said circuit; brake means for arresting the operation of said motor; a toggle device for operating said brake means; manually operable cam means in said housing; actuating means operatively connected between said cam means and said toggle device for operating said toggle device; switch-actuating means responsive to movement of said supporting means to open and close said switch; movable detent means on said supporting means and normally operative to withhold said switch-actuating means from operation, said detent means being engageable with and movable by the container placed on said supporting means to release said switch-actuating means for operation; and a link connected between said cam means and said supporting means and adapted to slide said supporting means in response to operation of said cam means, movement of said supporting means in one direction causing said agitator element to enter the container to mix the contents thereof and movement of said supporting means in the other direction causing withdrawal of the container from said agitating element.

12. A mixing device for mixing a substance in a container, including: a housing; supporting means on said housing and adapted to support the container; mixing means including a rotary agitator element disposed on said housing above said supporting means and adapted to mix the contents of the container; an electric motor for rotating said agitator element; an electric circuit for said motor; a pair of normally open switches connected in series in said circuit; cam operated means for closing one of said switches; and plunger means on said supporting means adapted to be engaged and operated by the container placed on said supporting means to close the other of said switches, the closing of both switches completing the circuit to said motor to energize the same.

13. A mixing device for mixing a substance in a container having an upper open end and a closed bottom, including: a housing; supporting means slidable vertically on said housing and adapted to support the container; mixing means including a rotary agitator element disposed on said housing above said supporting means in axial alignment with the container supported by said supporting means; cam means for sliding said supporting means, said cam means being normally operative to maintain said supporting means in lowermost position to separate said agitator element and the container but adapted to slide said supporting means toward said agitator element through a full stroke to cause said element to be disposed within the container adjacent the bottom thereof to mix the contents of the container and said cam means being adapted to slide said supporting means toward said agitator element through a partial stroke to cause said agitator element to be disposed within the container adjacent the upper end thereof so that particles of the substance adhering to said agitator element will be thrown off therefrom under the influence of centrifugal force; and means for operating said cam means.

14. A mixing device for mixing a substance in a container having an upper open end and a closed bottom, including: a housing; supporting means slidable vertically on said housing and adapted to support the container; mixing means including a rotary agitator element disposed on said housing above said supporting means in axial alignment with the container supported by said supporting means; power means for rotating said element; an arm pivotally mounted in said housing; cam means for pivoting said arm; a link connected between said arm and said supporting means and adapted to slide said supporting means in response to pivotal movement of said arm, said arm being normally in a neutral position to maintain said supporting means in lowermost position to separate said agitator element and the container but movable by said cam means to a position at one side of said neutral position to slide said supporting means toward said agitator element through a full stroke to cause said element to be disposed within the container adjacent the bottom thereof to adapt the element to mix the contents of the container, said arm being also movable by said cam means to a position at the other side of said neutral position to slide said supporting means toward said agitator element through a partial stroke to cause said agitator element to be disposed within the container adjacent the upper end thereof so that particles of the substance adhering to said agitator element will be thrown off therefrom under the influence of centrifugal force; and manually operable means for operating said cam means.

15. A mixing device for mixing a substance in a container, comprising: a housing; movable supporting means on said housing for supporting the container; power means in said housing; a bracket mounted on said housing at the upper end thereof; a spindle fast in said bracket and depending therefrom in axial alignment with the container supported by said supporting means; spaced antifriction bearings on said spindle; a tubular member surrounding said spindle and rotatable on said bearings, said member having a lower closed end; a bifurcated agitator element secured to and projecting downwardly from the closed end of said member; driving means between said power means and said tubular member for rotating said agitator element; cam means for moving said supporting means in a direction toward said agitator element to cause said element to enter the container to mix the contents thereof and in the other direction to effect withdrawal of said agitator element from the container following the mixing operation; and braking means actuated by said cam means following the mixing operation for arresting the rotation of said agitator element.

16. A mixing device for mixing a substance in a container, comprising: a housing; a slide member slidable vertically on said housing and adapted to support the container; mixing means on said housing above the container placed on said slide member and including a rotary agitator element adapted to mix the contents of the container when said slide member is slid upwardly; an electric motor for rotating said agitator element, said motor having a starting winding and a running winding; a main electric circuit and an auxiliary circuit for said motor windings, said auxiliary circuit by-passing said main circuit; switch means in said main circuit and responsive to the placing of the container on said slide member and also to upward sliding movement of said slide member to operative position to close said main circuit to effect flow of current through both windings in a direction to start said motor; means in said main circuit responsive to a predetermined rotative speed of said motor for de-energizing said starting winding; and relay means controlled by said starting winding and adapted to be energized in response to downward sliding movement of said slide member to inoperative position for opening said main circuit and closing said auxiliary circuit to continue the flow of current through said starting winding in said direction but to reverse the direction of flow of current through said running winding so as to tend to reverse the direction of rotation of said motor to cause rapid deceleration of the same, said relay means being de-energized by said starting winding in response to a predetermined reduction in rotative speed of said motor to open said auxiliary circuit and condition said main circuit for closing when said switch means is again closed.

17. A mixing device for mixing a substance in a container, comprising: a housing; a slide member slidable vertically on said housing and adapted to support the container; mixing means on said housing above the container placed on said slide member and including a rotary agitator element adapted to mix the contents of the container when said slide member is slid upwardly; an electric motor for rotating said agitator element, said motor having a starting winding and a running winding; a main electric circuit and an auxiliary circuit for said motor windings, said auxiliary circuit by-passing said main circuit; switch means in said main circuit and responsive to the placing of the container on said slide member and also to upward sliding movement of said slide member to operative position to close said main circuit to effect flow of current through both windings in a direction to start said motor; means in said main circuit responsive to a predetermined rotative speed of said motor for de-energizing said starting winding, said switch means being adapted to be automatically opened in response to downward movement of said slide member to inoperative position so as to open said main circuit; a relay coil connected in series with said starting winding in said auxiliary circuit; and control devices actuated by said relay coil for opening and closing either of said circuits, said coil being adapted to be energized by a surge of current generated by said starting winding when said main circuit is opened by said switch means to actuate said control devices in a manner to effect closing of said auxiliary circuit, said auxiliary circuit being so arranged and said windings being so connected in said auxiliary circuit that closing of said auxiliary circuit effects flow of current through said starting winding in said direction but reverses the flow of current through said running winding tending to reverse the direction of rotation of said motor and causing rapid deceleration in the speed of said motor, said relay coil being de-energized by said starting winding in response to a predetermined deceleration of said motor to open said auxiliary circuit and condition said main circuit for closing when said switch means is again closed.

ALLEN F. KIPPER.

(References on following page)

REFERENCES CITED

The following references are of record in the file of this patent:

UNITED STATES PATENTS

| Number | Name | Date |
|---|---|---|
| 1,351,243 | Graves | Aug. 31, 1920 |
| 1,700,729 | Gilchrist | Jan. 29, 1929 |
| 1,713,119 | Flegel | May 14, 1929 |
| 1,997,873 | Poplawski | Apr. 14, 1935 |
| 2,021,626 | Flegel | Nov. 19, 1935 |
| 2,109,501 | Osius | Mar. 1, 1938 |
| 2,284,155 | Landgraf | May 25, 1942 |